United States Patent [19]

Miyake et al.

[11] Patent Number: 4,969,982

[45] Date of Patent: Nov. 13, 1990

[54] METHOD FOR PRODUCING AN ALKALI METAL HYDROXIDE AND ELECTROLYTIC CELL USEFUL FOR THE METHOD

[75] Inventors: Haruhisa Miyake, Yokohama; Isamu Kaneko, Yamato; Atsushi Watakabe, Ayase, all of Japan

[73] Assignee: Asahi Glass Company, Ltd., Tokyo, Japan

[21] Appl. No.: 941,831

[22] Filed: Dec. 15, 1986

[30] Foreign Application Priority Data

Dec. 13, 1985 [JP] Japan .................. 60-279164

[51] Int. Cl.$^5$ .................. C25B 1/14; C25B 13/08
[52] U.S. Cl. .................. 204/98; 204/252; 204/283; 204/296; 204/128
[58] Field of Search .................. 204/98, 128, 283, 252, 204/296

[56] References Cited

U.S. PATENT DOCUMENTS

| | | | |
|---|---|---|---|
| 4,065,366 | 12/1977 | Oda et al. | 204/98 |
| 4,123,336 | 10/1978 | Seko et al. | 204/98 |
| 4,224,121 | 9/1980 | Dempsey et al. | 204/98 |
| 4,313,805 | 6/1983 | Burney et al. | 204/98 |
| 4,402,806 | 2/1982 | Coker et al. | 204/98 |
| 4,426,271 | 1/1984 | Yoshida et al. | 204/98 |
| 4,518,470 | 5/1985 | Oda et al. | 204/98 |

FOREIGN PATENT DOCUMENTS 029751 3/1981 European Pat. Off. .
045603 10/1982 European Pat. Off. .
57-9589 8/1978 Japan .
60-23776 7/1980 Japan .

OTHER PUBLICATIONS

Patent Abstracts of Japan, vol. 6, No. 244 (C-138) [1122], 2nd, Dec. 1982; & JP—A-57 143,332.

*Primary Examiner*—John F. Niebling
*Assistant Examiner*—Kathryn Gorgos
*Attorney, Agent, or Firm*—Oblon, Spivak, McClelland, Maier & Neustadt

[57] ABSTRACT

A method for producing an alkali metal hydroxide by electrolysis in an electrolytic cell comprising an anode compartment and a cathode compartment, which comprises supplying an alkali metal chloride to the anode compartment and water or a dilute alkali metal hydroxide to the cathode compartment, wherein a fluorine-containing cation exchange membrane comprising a first outer layer of a perfluorocarbon polymer having —SO$_3$M groups (wherein M is an alkali metal) with a thickness of at least 5 µm, and a second layer of a perfluorocarbon polymer having —CO$_2$M groups (wherein M is an alkali metal) and a water content of from 2 to 7% by weight in a 45% wt % NaOH aqueous solution with a thickness of at least 5 µm, the water content of the first layer being higher than that of the second layer, is disposed with the first layer facing the cathode compartment.

17 Claims, No Drawings

METHOD FOR PRODUCING AN ALKALI METAL HYDROXIDE AND ELECTROLYTIC CELL USEFUL FOR THE METHOD

The present invention relates to a method for producing an alkali metal hydroxide and an electrolytic cell useful for the method. More particularly, the present invention relates to a method and electrolytic cell for producing an alkali metal hydroxide in a relatively high concentration by an ion exchange membrane method.

A so-called ion exchange method for alkali electrolysis wherein an aqueous alkali metal chloride solution is electrolyzed by means of a fluorine-containing cation exchange membrane as a diaphragm to produce an alkali metal hydroxide and chlorine, has been commonly employed internationally in recent years, since it is thereby possible to produce a highly pure alkali metal hydroxide at a substantially low consumption of energy as compared with conventional methods.

At the initial stage in the commercial use of such an ion exchange membrane method for alkali electrolysis, it was common to use a fluorine-containing cation exchange membrane having sulfonic acid groups as the ion exchange groups, whereby it was impossible to gain high current efficiency. Therefore, in recent years, such a membrane has been replaced by a cation exchange membrane having carboxylic acid groups at least on the cathode side of the membrane, whereby the current efficiency in the electrolysis has been improved to a level of from 92 to 97%, which is substantially adequate for industrial purposes.

However, it has been found that when such a carboxylic acid type cation exchange membrane is used, excellent current efficiency at a low voltage is obtainable for a long period of time only when the production is limited for an alkali metal hydroxide having a concentration of up to about 36–40% by weight. According to the study by the present inventors, current efficiency as high as from 94 to 98% is obtainable up to the alkali metal hydroxide concentration of about 40% by weight. If the alkali hydroxide concentration exceeds this limit, the current efficiency deteriorates. Further, at such a high concentration, the membrane resistance also increases abruptly, and the electrolytic cell voltage increases accordingly. If the operation is continued for a long period of time i.e. from one week to one year, the current efficiency gradually decreases. From the measurement of the ion exchange capacity of the cathode side surface of the membrane used for the operation at such a high concentration of an alkali metal hydroxide for a long period of time, it has been found that the ion exchange capacity of the surface has decreased due to the decomposition of the carboxylic acid groups. Therefore, the cation exchange membrane having carboxylic acid groups on the cathode side of the membrane is not suitable for the industrial production of an alkali metal hydroxide at such a high concentration as mentioned above.

On the other hand, U.S. Pat. No. 4,455,210 proposes to produce an alkali metal hydroxide at a high concentration by using a cation exchange membrane prepared by laminating a fluorine-containing polymer film having sulfonic acid groups on the cathode side of a fluorine-containing polymer film having sulfone amide groups. However, in this method, the initial current efficiency is low, and when the operation is continued for a long period of time, the current efficiency tends to decrease further.

Japanese Examined Patent Publication No. 9589/1982 discloses a method to obtain sodium hydroxide at a concentration of 40% by weight by using a fluorine-containing cation exchange membrane comprising a sulfonic acid group-containing layer of about 2 $\mu$m on the cathode side of a carboxylic acid group-containing layer. Other examples in which a thin sulfonic acid group-containing layer is provided on the cathode side of a membrane, are disclosed in Japanese Unexamined Patent Publication No. 83030/1983 and Japanese Examined Patent Publication No. 23776/1985, and a method for obtaining sodium hydroxide at a concentration of about 35% by weight is disclosed. These references are all concerned with reduction of the electrolytic voltage. According to the study by the present inventors, when such a sulfonic acid group-containing layer on the cathode side is thin as disclosed, a current efficiency as high as about 95% is obtainable at an alkali metal hydroxide concentration of 40% by weight, but at an alkali metal hydroxide concentration of 45% or higher, the current efficiency is only at a level of about 90%, and the current efficiency tends to decrease as time passes.

If an alkali metal hydroxide can be produced at such a high concentration at a high current efficiency under a low electric cell voltage, it is possible to save the energy which used to be required for the concentration of the alkali metal hydroxide.

It is an object of the present invention to provide a method and an electrolytic cell for producing a highly concentrated alkali metal hydroxide by using an ion exchange membrane, whereby a highly concentrated alkali metal hydroxide at a level of at least 42% by weight, especially at least 45% by weight, is produced at a high current efficiency not only during the initial stage but also during the operation for a long period of time.

A further object of the present invention is to provide a method and an electrolytic cell for producing a highly concentrated alkali metal hydroxide by using an ion exchange membrane, whereby not only the high current efficiency but also a low electrolytic voltage can be maintained for a long period of time by virtue of a low membrane resistance.

The present invention has been accomplished to solve the above-mentioned problems, and provides a method for producing an alkali metal hydroxide at a relatively high concentration at a level of at least 42% by weight, especially at least 45% by weight, by electrolysis in an electrolytic cell comprising an anode compartment and a cathode compartment, which comprises supplying an aqueous alkali metal chloride solution to the anode compartment and water or a dilute alkali metal hydroxide aqueous solution to the cathode compartment, wherein a fluorine-containing cation exchange membrane comprising a first outer layer of a perfluorocarbon polymer having —$SO_3M$ groups (wherein M is an alkali metal) with a thickness of at least 5 $\mu$m, and a second layer of a perfluorocarbon polymer having —$CO_2M$ groups (wherein M is an alkali metal) and a water content of from 2 to 7% by weight in a 45 wt % NaOH aqueous solution with a thickness of at least 5 $\mu$m, the water content of the first layer in a 45 wt % NaOH aqueous solution being higher than that of the second layer, is disposed with the first layer facing the cathode compartment.

Now, the present invention will be described in detail with reference to the preferred embodiments.

In the present invention, the thickness of the first layer of a perfluorocarbon polymer having —$SO_3M$ groups (wherein M is an alkali metal) is at least 5 μm, preferably from 10 to 100 μm. If the thickness is less than 5 μm, no adequate current efficiency is obtainable for the production of an alkali metal hydroxide at a concentration of at least 45% by weight, and it is not possible to adequately prevent the deterioration of the carboxylic acid groups by the high concentration of the alkali metal hydroxide. On the other hand, if the thickness exceeds 100 μm, the membrane resistance tends to be high, whereby the electrolytic voltage increases, such being undesirable. The second layer of a perfluorocarbon polymer having —$CO_2M$ groups (wherein M is an alkali metal) has a thickness of at least 5 μm and has a water content within a range of from 2 to 7% by weight in a 45 wt % NaOH aqueous solution, the water content of the first layer in a 45 wt % NaOH aqueous solution being higher than that of the second layer by at least 3%, preferably at least 5%, but not higher than 30% preferably not higher than 25%. If the thickness of the second layer or the water contents of the first and second layers are outside the above ranges, a sufficiently high current efficiency is hardly obtainable. Here, the water content in a 45 wt % NaOH aqueous solution is represented by the formula:

$$\frac{a-b}{b} \times 100 \, (\%)$$

where a is the weight (g) of a cation exchange membrane which has been hydrolyzed, then immersed in a 45 wt % NaOH aqueous solution at the temperature of electrolysis for 16 hours, cooled to 25° C. and wiped for the removal of the aqueous solution from the membrane surface, and b is the weight (g) of the membrane after it has been further immersed in deionized water at 90° C. for 16 hours and vacuum-dried at 130° C. for 16 hours.

The first layer has an ion exchange capacity of preferably from 0.6 to 1.6 meq/g dry resin, more preferably from 0.85 to 1.5 meq/g dry resin. Likewise, the second layer has an ion exchange capacity of preferably from 0.6 to 1.8 meq/g dry resin, more preferably from 0.8 to 1.6 meq/g dry resin. For the first layer, an inorganic substance such as a metal or metal oxide may be incorporated.

In the present invention, the perfluorocarbon polymer is meant for a fluorinated hydrocarbon polymer wherein the proportion in number of fluorine atoms in the total number of hydrogen and halogen atoms bonded to carbon atoms, is at least 90%. The perfluorocarbon polymer constituting the above-mentioned first or second layer is preferably a copolymer of at least two types of monomers, and particularly preferred is a copolymer having the following repeating units (a) and (b):

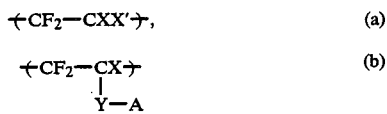

wherein each of X and X' is —F, —Cl, —H or —$CF_3$, A is —$SO_3M$ or —COOM (wherein M is hydrogen or an alkali metal) or a group which can be converted to such groups by hydrolysis, and Y is selected from the following groups:

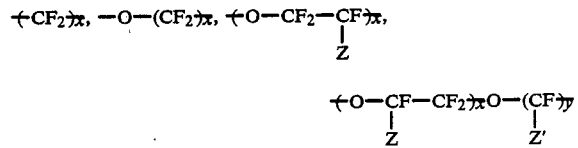

wherein each of Z and Z' is —F or a perfluoroalkyl group having from 1 to 10 carbon atoms, and each of x and y is a integer of 1 to 10.

The molar ratio of (a)/(b) constituting the above polymer is selected so that the fluorine-containing polymer will have the above-mentioned ion exchange capacity.

The above-mentioned fluorine-containing polymer is preferably a perfluoropolymer. Preferred examples include a copolymer of $CF_2=CF_2$ with $CF_2=CFOCF_2CF(CF_3)OCF_2CF_2SO_2F$, a copolymer of $CF_2=CF_2$ with $CF_2=CFO(CF_2)_{2-5}SO_2F$, a copolymer of $CF_2=CF_2$ with $CF_2=CFO(CF_2)_{2-5}COOCH_3$, and a copolymer of $CF_2=CF_2$ with $CF_2=CFOCF_2CF(CF_3)OCF_2CF_2COOCH_3$.

In the present invention, there is no particular restriction as to the method for laminating the first and second layers, and various methods may be employed. For instance, the first and second layers may be prepared separately, then laminated one on the other, and heat-bonded to each other at a temperature higher than the melting points of the first and second layers, e.g. at a temperature of from 100° to 320° C. Otherwise, at the stage of fabricating the first and second layers, the polymers for both layers may be co-extruded so that the film-forming and the lamination can be accomplished simultaneously (U.S. Pat. No. 4,437,952).

Another useful method for lamination of the first and second layers is such that one of the layers is preliminarily fabricated, and a fluorine-containing polymer constituting the other layer or a fluorine-containing polymer having functional groups capable of being readily converted to —$SO_3M$ or —$CO_2M$ groups (wherein M is an alkali metal) is coated or impregnated in the form of a solution or dispersion on the fabricated membrane, and then the medium is removed by drying to form a thin layer of a fluorine-containing polymer, whereby a laminated membrane having the two layers firmly bonded is obtainable.

The polymer solution wherein the fluorine-containing polymer for the first or second layer is dissolved or dispersed, is known, e.g. from Japanese Unexamined Patent Publications No. 72022/1981 and No. 192464/1982 and Japanese Examined Patent Publication No. 13333/1973. Such polymer solutions as disclosed in these references may be employed.

If necessary, in addition to the first and second layers, a third layer may be laminated for the fluorine-containing cation exchange membrane to be used in the present invention. Preferred as such a third layer, is a layer of a fluorine-containing polymer having —$SO_3M$ or —$CO_2M$ groups (wherein M is as defined above) and having a thickness of from 30 to 350 μm and an electric resistance lower than the second layer, or a porous layer of a fluorine-containing polymer having a thickness of from 10 to 450 μm and a porosity of from 30 to 95%, with its surface and interior made hydrophilic, formed on the anode side of the second layer. By the lamination of such a third layer, the mechanical strength of the membrane can be improved and stabilized over the membrane composed solely of the first and second layers.

As the third layer of a fluorine-containing polymer having —SO$_3$M or —CO$_2$M groups, the same fluorine-containing polymer as described for the first and second layers, may be employed. When a fluorine-containing polymer having —CO$_2$M groups is used, it is preferred to employ a polymer having an ion exchange capacity and thickness greater by from 0.1 to 1.0 meq/g dry resin and from 10 to 300 μm, respectively, than the second layer. In the case of a fluorine-containing polymer having —SO$_3$M groups, the ion exchange capacity is preferably from 0.65 to 1.5 meq/g dry resin, and the thickness is preferably from 30 to 350 μm.

Further, in the case where a porous layer of a fluorine-containing polymer with its surface and interior made hydrophilic is employed as the third layer, a polytetrafluoroethylene porous material with its surface treated with an inorganic or organic agent for imparting the hydrophilic nature (Japanese Unexamined Patent Publication No. 149336/1980) may be employed.

Further, if necessary, a bonding layer may further be provided to ensure the firm bonding of the first and second layers, or the second and third layers to obtain a fluorine-containing cation exchange membrane to be used in the present invention. Such a bonding layer may be a layer of a blend of a fluorine-containing polymer having sulfonic acid groups and a fluorine-containing polymer having carboxylic acid groups in a weight ratio of from 1 to ¼, or a layer of a fluorine-containing polymer having both sulfonic acid groups and carboxylic acid groups preferably in a ratio of from 2/1 to ½, and having a thickness of preferably from 5 to 50 μm. Such a bonding layer may be inserted at the time of bonding the first and second layer or the third layer thereto, followed by heating for melt bonding.

The fluorine-containing cation exchange membrane thus prepared and useful for the present invention, has an overall thickness of preferably from 50 to 500 μm, more preferably from 100 to 300 μm.

The above-mentioned fluorine-containing cation exchange membrane may be used as it is. Preferably, however, at least one surface of the cation exchange membrane, particularly at least the anode side surface of the cation exchange membrane, is treated for releasing chlorine gas to further improve the stability of the current efficiency for a long period of time.

The reason why the chlorine gas releasing properties of the anode side surface of the ion exchange membrane contributes to the stability of the current efficiency for a long period of time, is not clearly understood, but is believed to be as follows.

Namely, if the chlorine gas is attached to the anode surface, it penetrates into the membrane and contact the alkali metal hydroxide from the cathode side, to form an alkali metal chloride. When the alkali metal hydroxide concentration is low, the formed alkali metal chloride will be eluted without precipitation in the membrane. However, during the production of an alkali metal hydroxide at an alkali metal hydroxide concentration of more than 40% by weight, the formed alkali metal chloride will precipitate in the membrane, whereby the stability of the current efficiency for a long period of time will be impaired. However, the present invention is by no means restricted by such a description of the mechanism.

As the method for the treatment of the surface of the ion exchange membrane for releasing the chlorine gas, there may be mentioned a method wherein fine irregularities (concave-convex) are formed on the membrane surface (Japanese Examined Patent Publication No. 26495/1975), a method wherein hydrophilic inorganic particles are deposited on the membrane surface by supplying an electrolyte containing inorganic ions such as iron or zirconia ions to the electrolytic cell (Japanese Unexamined Patent Publication No. 152980/1981), or a method wherein a gas and liquid permeable porous layer containing electrocatalytically inactive particles (Japanese Unexamined Patent Publications No. 75583/1981 and No. 39185/1982) is provided. Such a gas-releasing layer on the surface of the ion exchange membrane serves not only to improve the stability of the current efficiency for a long period of time, but also to further reduce the membrane resistance during the electrolysis.

The electrolysis of an alkali metal chloride aqueous solution by means of the fluorine-containing cation exchange membrane of the present invention may be conducted under known conditions as disclosed in the above-mentioned Japanese Unexamined Patent Publication No. 112398/1969. For instance, the electrolysis is conducted by supplying an aqueous alkali metal chloride solution of from 2.5 to 5.0 N into the anode compartment and water or dilute alkali metal hydroxide into the cathode compartment, preferably at a temperature of from 50° to 120° C. at a current density of from 10 to 100 A/dm$^2$. In such a case, it is preferred to minimize the presence of heavy metal ions such as calcium or magnesium in the aqueous alkali metal chloride solution, since such heavy metal ions bring about a deterioration of the ion exchange membrane. Further, in order to prevent as far as possible the generation of oxygen at the anode, an acid such as hydrochloric acid may be added to the aqueous alkali metal chloride solution.

In the present invention, the electrolytic cell may be a monopolar type or bipolar type, so long as the above construction is employed. With respect to the material constituting the electrolytic cell, for instance, in the case of the anode compartment for the electrolysis of an aqueous alkali metal chloride solution, a material resistant to an aqueous alkali metal chloride solution and chlorine, such as a valve metal like titanium, may be used, and in the case of the cathode compartment, iron, stainless steel or nickel resistant to an alkali metal hydroxide and hydrogen, may be used.

In the present invention, when an electrode is to be installed, it may be disposed in contact with the cation exchange membrane, or may be disposed with a space from the membrane. Particularly in the case of the present invention, an advantageous cell voltage resulting from the low membrane resistance, can be obtained without any trouble when the electrode is disposed in contact with the membrane.

In the present invention, the sulfonic acid group-containing layer on the cathode side is present between the highly concentrated alkali metal hydroxide and the carboxylic acid group-containing layer, and the alkali metal hydroxide concentration in the sulfonic acid group-containing layer is believed to be gradually lower from the cathode side towards the inner carboxylic acid side, and the degree of the lowering is believed to be greater as the thickness of the sulfonic acid group-containing layer is greater. Thus, the sulfonic acid group-containing layer with a certain thickness, has a function to let the carboxylic acid group-containing layer contact an alkali metal hydroxide at a concentration lower than the actual concentration. As a result, even in a highly concentrated alkali metal hydroxide at a level of at least 42% by weight, current efficiency as high as about 95% which can hardly be attained with a carboxylic acid membrane, can be obtained, and the substantial increase of the resistance of the carboxylic acid layer due to a highly concentrated alkali metal can be adequately controlled.

The reason for selecting sulfonic acid groups as ion exchange groups for the cathode side layer among various ion exchange groups such as carboxylic acid groups, sulfonic acid groups, sulfonamide groups and phosphoric acid groups, is that sulfonic acid groups were most effective in the durability as measured by the durability test which comprises immersing membranes having various ion exchange groups in a high temperature high concentration alkali metal hydroxide solution.

Now, the present invention will be described with reference to Examples. However, it should be understood that the present invention is by no means restricted to these specific Examples.

EXAMPLE 1

To a film of a $CF_2=CF_2/CF_2=CFOCF_2CF_2CF_2CO_2CH_3$ copolymer having an ion exchange capacity of 1.44 meq/g dry resin and a thickness of 200 $\mu m$, a film of a $CF_2=CF_2/CF_2=CFOCF_2CF_2CF_2CO_2CH_3$ copolymer having an ion exchange capacity of 1.25 meq/g dry resin having a thickness of 20 $\mu m$ was heat-pressed for lamination. On the other hand, a mixture comprising methyl cellulose containing 30% by weight of $ZrO_2$ having a particle size of 5 $\mu m$, water, cyclohexanol and cyclohexane, was kneaded to obtain a paste. The paste was coated on a Maylar film and dried to form a porous $ZrO_2$ layer having a thickness of 10 $\mu m$ and with the deposition of $ZrO_2$ particles in an amount of 1 mg per $cm^2$ of the film surface. Then, the porous $ZrO_2$ layer was transferred to the above laminated membrane on the side having an ion exchange capacity of 1.44 meq/g dry resin, by heat pressing, and then subjected to hydrolysis in 25% NaOH at 70° C. for 16 hours. Then, a 7 wt % ethanol solution of a $CF_2=CF_2/CF_2=CFOCF_2CF(CF_3)OCF_2CF_2SO_3H$ copolymer having an ion exchange capacity of 1.1 meq/g dry resin, was cast on the surface of the carboxylic acid polymer side having an ion exchange capacity of 1.25 meq/g dry resin, and dried in air at 60° C. to form a coating layer having a thickness of 6 $\mu m$. Such a laminated membrane was immersed in 25 wt % NaOH in 16 hours.

To the carboxylic acid polymer side having an ion exchange capacity of 1.44 meq/g dry resin with a porous $ZrO_2$ layer deposited thereon, of the membrane thus obtained, an anode prepared by coating a solid solution of ruthenium oxide, iridium oxide and titanium oxide on a titanium punched metal (short opening diameter: 4 mm, long opening diameter: 8 mm) and having a low chlorine overvoltage, was pressed from the cathode side so that the membrane and the anode are brought in contact with each other, whereas at the sulfonic acid polymer side having an ion exchange capacity of 1.1 meq/g dry resin, a cathode prepared by subjecting a SUS 304 punched metal (short opening diameter: 4 mm, long opening diameter: 8 mm) to etching treatment in an aqueous solution containing 52% by weight of sodium hydroxide at 150° C. for 52 hours and having a low hydrogen overvoltage, was disposed so that the distance of the membrane and the cathode was maintained to be 2 mm. Then, electrolysis was conducted at 90° C. at a current density of 30 $A/dm^2$, while supplying a 5N sodium chloride aqueous solution to the anode compartment and water to the cathode compartment, and maintaining the sodium chloride concentration in the anode compartment at 3.5N and the sodium hydroxide concentration in the cathode compartment at a level of 45% by weight, whereby sodium hydroxide having a concentration of 45% by weight was obtained at a current efficiency of 92% under a cell voltage of 3.7 V. No reduction of the current efficiency was observed during the continuous hydrolysis for 40 days. Then, the membrane was taken out from the electrolytic cell and examined, whereby no abnormality such a precipitation of a salt in the membrane, was observed.

EXAMPLE 2

To one side of a film of a $CF_2=CF_2/CF_2=CFOCF_2CF_2CF_2CO_2CH_3$ copolymer having an ion exchange capacity of 1.17 meq/g dry resin and a thickness of 200 $\mu m$, the same treatment for releasing chlorine bubbles by using $ZrO_2$ particles as in Example 1 was applied, followed by hydrolysis in 25 wt % sodium hydroxide at 90° C. for 16 hours. Then, to the side on which no treatment for releasing chlorine bubbles was applied, a 8% ethanol solution of a $CF_2=CF2/CF_2=CFOCF_2CF_2SO_3NH_4$ copolymer having an ion exchange capacity of 1.0 meq/g dry resin, was cast and dried in air at 60° C. to form a coating layer having a thickness of 8 $\mu m$. This membrane was immersed in 25 wt % sodium hydroxide at 90° C. for 16 hours, and then disposed in an electrolytic cell so that the sulfonic acid polymer layer faced the cathode side. By using the electrolytic cell, electrolysis of the aqueous sodium chloride solution was conducted in the same manner as in Example 1, whereby sodium hydroxide having a concentration of 45% by weight was obtained at a current efficiency of 93% under a cell voltage of 4.3 V.

COMPARATIVE EXAMPLE 1

To a membrane of a $CF_2=CF_2/CF_2=CFOCF_2CF(CF_3)OCF_2CF_2SO_2F$ copolymer having an ion exchange capacity of 0.91 meq/g dry resin and a thickness of 220 $\mu m$, the same treatment for releasing chlorine bubbles as in Example 1, was applied, followed by hydrolysis in 30% dimethyl sulfoxide/11% KOH at 90° C. for 20 minutes and immersion in 2% sodium hydroxide at room temperature for 2 hours. The membrane thus obtained was disposed in an electrolytic cell so that the side of the membrane treated for releasing chlorine bubbles faced the anode side. Electrolysis of the aqueous sodium chloride solution was conducted in the same manner as in Example 1, whereby sodium hydroxide having a concentration of 45% by weight, was obtained at a current efficiency of 70% under a cell voltage of 3.9 V.

EXAMPLE 3

To one side of a film of a $CF_2=CF_2/CF_2=CFOCF_2CF_2CO_2CH_3$ copolymer having an ion exchange capacity of 1.38 meq/g dry resin and having a thickness of 200 $\mu m$, the same treatment for releasing chlorine bubbles as in Example 1, was applied, followed by hydrolysis in 25 wt % sodium hydroxide at 70° C. for 16 hours. Then, to the side on which no treatment for releasing chlorine bubbles was applied, a 8% ethanol solution of a $CF_2=CF_2/CF_2=CFOCF_2CF_2CF_2SO_3H$ copolymer having an ion exchange capacity of 1.0 meq/g dry resin, was cast and dried in air at 60° C. to form a coating layer having a thickness of 11 μm. This membrane was immersed in 25 wt % sodium hydroxide at 70° C. for 16 hours, and disposed in an electrolytic cell so that the sulfonic acid polymer layer faced the cathode side. Electrolysis of an aqueous sodium chloride solution was conducted in the same manner as in Example 1, whereby sodium hydroxide having a concentration of 45% by weight was obtained at a current efficiency of 93% under a cell voltage of 3.7 V.

EXAMPLE 4

A polytetrafluoroethylene porous material having a pore diameter of 2 μm, a porosity of 70%, a gurley number of 5 and a thickness of 120 μm was laminated on a film of a $CF_2=CF_2/$ $CF_2=CFO(CF_2)_3COOCH_3$ copolymer having an ion exchange capacity of 1.25 meq/g dry resin and a thickness of 40 μm to obtain a double layer membrane having a thickness of 150 μm.

Then, an ethanol solution of a $CF_2=CF_2/CF_2=CFOCF_2CFCF_3O(CF_2)_2SO_3H$ copolymer (copolymer A) having an ion exchange capacity of 1.1 meq/g dry resin, was cast on the film of the above double layer membrane, and dried to obtain a three layer membrane having the copolymer A coated in a thickness of 7 μm.

Then, a solution containing the copolymer A and zirconyl chloride, was impregnated to the porous structure of the three layered membrane, and dried to have the inner wall of the porous structure coated with a mixture of the copolymer A and zirconyl chloride, to obtain a three layer membrane having the hydrophilic nature imparted to the inner wall of the porous structure.

Then, a suspension of $ZrO_2$ having a particle size of 5 μm in a solution of the copolymer A, was spray-coated to the porous structure side and the copolymer A side of the three layer membrane, to obtain a multi-layer membrane having fine $ZrO_2$ particles deposited thereon.

The multi-layer membrane thus obtained, was immersed in sodium hydroxide, and then disposed in an electrolytic cell so that an anode having a low chlorine overvoltage was in contact with the polytetrafluoroethylene porous layer side, and a cathode having a low hydrogen overvoltage was in contact with the copolymer A side. Then, electrolysis was conducted at 90° C. at a current density of 30 A/dm² while maintaining the sodium hydroxide concentration in the cathode compartment at a level of 45% by weight, whereby the current efficiency was 93.0% and the cell voltage was 3.04 V.

EXAMPLE 5

A multi-layer membrane was prepared in the same manner as in Example 4 except that the thickness of the copolymer A cast, was changed to 20 μm, and the electrolysis was conducted in the same manner, whereby the current efficiency was 95.01 and the cell voltage was 3.05 V.

EXAMPLE 6

A multi-layer membrane was prepared in the same manner as in Example 4 except that instead of the casting with the ethanol solution of the copolymer A, an ethanol solution of a mixture of 5 μm $ZrO_2$ particles/copolymer A =4/6 was cast to obtain a layer of $ZrO_2$ particles having a thickness of 30 μm, and electrolysis was conducted in the same manner, whereby the current efficiency was 95.0% and the cell voltage was 3.05 V. No change in the performance was observed during the continuous operation for 60 days.

EXAMPLE 7

A mixture comprising methyl cellulose containing 30% by weight of $ZrO_2$ having a particle size of 5 μm, water, cyclohexanol and cyclohexane was kneaded to obtain a paste. The paste was coated on a Maylar film and dried to form a porous $ZrO_2$ layer having a thickness of 10 μm and with the deposition of $ZrO_2$ particles in an amount of 1 mg per cm² of the film surface. Then, the porous $ZrO_2$ layer was transferred by heat pressing to one side of a film of a $CF_2=CF_2/CF_2=CFO(CF_2)_3CO_2CH_3$ copolymer having an ion exchange capacity of 1.32 meq/g dry resin having a thickness of 170 μm, and an ethanol solution of a $CF_2=CF_2/CF_2=CFOCF_2CF(CF_3)O(CF_2)_2SO_3H$ copolymer having an ion exchange capacity of 1.1 meq/g dry resin was cast on the other side and dried to form a coating layer having a thickness of 20 μm. Such a membrane was immersed in 25 wt % NaOH at 70° C. for 16 hours for hydrolysis.

To the porous $ZrO_2$ layer side of the membrane thus obtained, an anode prepared by coating a solid solution of ruthenium oxide, iridium oxide and titanium oxide on a titanium punched metal (short opening diameter: 4 mm, long opening diameter: 8 mm) and having a low chlorine overvoltage, was pressed from the cathode side so that the membrane and the anode are brought in contact with each other, whereas at the opposite side of the membrane, a cathode prepared by subjecting a SUS 304 punched metal (short opening diameter: 4 mm, long opening diameter: 8 mm) to etching treatment in an aqueous solution containing 52% by weight of sodium hydroxide at 150° C. for 52 hours and having a low hydrogen overvoltage, was disposed so that the distance of the membrane and the cathode was maintained to be 2 mm. Then, electrolysis was conducted at 90° C. at a current density of 30 A/dm², while supplying a 5N sodium chloride aqueous solution to the anode compartment and water to the cathode compartment, and maintaining the sodium chloride concentration in the anode compartment at 3.5N and the sodium hydroxide concentration in the cathode compartment at a level of 45% by weight, whereby sodium hydroxide having a concentration of 45% by weight was obtained at a current efficiency of 95% under a cell voltage of 3.5 V. No reduction in the current efficiency was observed during the continuous electrolytic operation for 3 months. The membrane was taken out from the electrolytic cell and examined, whereby no abnormality such as precipitation of a salt in the membrane, was observed. The water contents in 45 wt % NaOH of the membranes used for the carboxylic acid layer and the sulfonic acid layer, were 3.2% and 16.6%, respectively.

COMPARATIVE EXAMPLE 2

To one side of a film of a $CF_2=CF_2/CF_2=CFO(CF_2)_3CO_2-CH_3$ copolymer having an ion exchange capacity of 1.25 meq/g dry resin and a thickness of 250 μm, the same treatment for releasing chlorine bubbles as in Example 7, was applied, followed by hydrolysis in 25 wt % NaOH at 90° C. for 16 hours. Then, electrolysis was conducted in the same manner as in Example 7, whereby the initial current efficiency was 92% and the initial cell voltage was 3.9 V at a sodium hydroxide concentration of 45% by weight, but one month later, the current efficiency dropped to 87%. The same membrane was used for the electrolysis at a sodium hydroxide concentration of 48% by weight, whereby the initial current efficiency was 88%, and the cell voltage was 4.0 V.

COMPARATIVE EXAMPLE 3

The electrolytic experiment was conducted in the same manner as in Example 7 except that the thickness of the sulfonic acid polymer layer was changed to 2 μm, whereby the initial current efficiency was 92%, and one month later, the current efficiency dropped to 89%.

EXAMPLE 8

The electrolytic experiment was conducted in the same manner as in Example 7 except that the sodium hydroxide concentration during the electrolysis was changed to 50% by weight, whereby the current efficiency was 95%, and the cell voltage was 3.6 V.

EXAMPLE 9

The electrolytic experiment was conducted in the same manner as in Example 7 except that a film of a $CF_2=CF_2/CF_2=CFO(CF_2)_3CO_2CH_3$ copolymer having an ion exchange capacity of 1.25 meq/g dry resin and a thickness of 100 μm was used, and the thickness of the coating layer of a $CF_2=CF_2/CF_2=CFOCF_2CF(CF_3)O(CF_2)_2SO_3H$ copolymer having an ion exchange capacity of 1.1 meq/g dry resin was changed to 10 μm, whereby the current efficiency was 94%, and the cell voltage was 3.6 V. The water content in 45 wt % NaOH of the membrane for the carboxylic acid layer was 3.1%.

EXAMPLE 10

To one side of a film of a $CF_2=CF_2/CF_2=CFO(CF_2)_2CO_2CH_3$ copolymer having an ion exchange capacity of 1.38 meq/g dry resin and a thickness of 200 μm, an ethanol solution of a $CF_2=CF_2/CF_2=CFO(CF_2)_2SO_3H$ copolymer having an ion exchange capacity of 1.4 meq/g dry resin, was cast and dried to form a coating layer having a thickness of 50 μm. The membrane was hydrolyzed in 25 wt % NaOH at 70° C. for 16 hours, and then disposed in an electrolytic cell so that the sulfonic acid polymer layer faced the cathode side. Then, electrolysis was conducted in the same manner as in Example 7. Further, during the initial stage of the electrolysis, 5N sodium chloride containing 10 ppm of zirconium was supplied for 5 hours to deposit a layer of fine zirconium hydroxide particles on the surface of the anode side of the membrane. Sodium hydroxide having a concentration of 45% by weight was obtained at a current efficiency of 95% under a cell voltage of 3.8 V. The water contents in 45 wt % NaOH of the membranes for the carboxylic acid layer and the sulfonic acid layer, were 3.5% and 20%, respectively.

EXAMPLE 11

A $CF_2=CF_2/CF_2=CFO(CF_2)_3CO_2CH_3$ copolymer having an ion exchange capacity of 1.32 meq/g dry resin and a $CF_2=CF_2/CF_2=CFOCF_2CF(CF_3)O(CF_2)_2SO_2F$ copolymer having an ion exchange capacity of 1.1 meq/g dry resin, were co-extruded to obtain a double layer membrane with the respective layers being 170 μm and 30 μm in thickness. The membrane was hydrolyzed in an aqueous solution containing 15% by weight of potassium hydroxide at 50° C. for 40 hours, and then disposed in an electrolytic cell so that the sulfonic acid layer faced the cathode side. Then, electrolysis was conducted in the same manner as in Example 7, whereby the current efficiency was 93%. The water contents in 45 wt % NaOH of the membranes for the carboxylic acid layer and the sulfonic acid layer, were 4.4% and 13.5%, respectively.

EXAMPLE 12

To a film of a $CF_2=CF_2/CF_2=CFOCF_2CF(CF_3)O(CF_2)_2SO_2F$ copolymer having an ion exchange capacity of 0.93 meq/g dry resin and a thickness of 200 μm, a film of a $CF_2=CF_2/CF_2=CFOCF_2CF(CF_3)O(CF_2)_3CO_2CH_3$ copolymer having an ion exchange capacity of 0.93 meq/g dry resin and a thickness of 20 μm, was laminated, and to the surface of the polymer layer side containing $-SO_2F$ groups, the same treatment for releasing chlorine bubbles as in Example 7, was applied. The membrane was hydrolyzed in 11% KOH/30% dimethylsulfoxide at 90° C. for 20 minutes, and immersed in 2% NaOH at room temperature, and then dried. Then, an ethanol solution of a $CF_2=CF_2/CF_2=CFOCF_2CF(CF_3)O(CF_2)_2-SO_3H$ copolymer having an ion exchange capacity of 1.1 meq/g dry resin, was cast on the surface of the carboxylic acid polymer side and dried to form a coating layer having a thickness of 30 μm. On this coating layer, a suspension comprising 84.5% by weight of ethanol, 13.0% by weight of $ZrO_2$, 2.5% by weight of a $CF_2=CF_2/CF_2=CFOCF_2CF(CF_3)O(CF_2)_2SO_3H$ copolymer having an ion exchange capacity of 1.1 meq/g dry resin and a small amount of a non-ionic surfactant Triton X-100, was sprayed to deposit 2 $g/m^2$ of $ZrO_2$. This membrane was immersed in 25 wt % NaOH at 90° C. for 16 hours, and disposed in an electrolytic cell so that the side treated for releasing chlorine bubbles, faced the anode side. Then, electrolysis was conducted in the same manner as in Example 7, whereby sodium hydroxide having a concentration of 43% by weight was obtained at a current efficiency of 94% under a cell voltage of 3.4 V. The water content in 45 wt % NaOH of the membrane of the carboxylic acid layer, was 4.5%.

REFERENCE EXAMPLE

To one side of a film of a $CF_2=CF_2/CF_2=CFO(CF_2)_3CO_2CH_3$ copolymer having an ion exchange capacity of 1.25 meq/g dry resin and a thickness of 250 μm, a coating layer of a $CF_2=CF_2/CF_2=CFOCF_2CF(CF_3)O(CF_2)_2SO_3H$ copolymer having an ion exchange capacity of 1.1 meq/g dry resin and a thickness of 20 μm was formed, or not formed. In each case, electrolysis was conducted in the same manner as in Example 7 at a sodium hydroxide concentration of 45% by weight for 3 months. Each membrane was taken out from the electrolytic cell. The membrane having the sulfonic acid polymer layer was immersed in a mixture of hot water and ethanol, whereupon the sulfonic acid polymer layer was wiped off with a filter paper. Then, each membrane was immersed in water at 90° C. for 50 hours, during which the solution was repeatedly changed afresh, and then it was dried. The ion exchange capacity of the surface on the cathode side of the carboxylic acid layer of each membrane, was obtained by measuring the fluorescent X-ray intensity of Na and comparing it with the value obtained by treating a membrane not used for electrolysis, in the same manner. As a result, the ion exchange capacity of the surface on the anode side of the membrane having a sulfonic acid polymer layer of 20 μm was not different from the value before the electrolysis, whereas the ion exchange capacity of the surface on the cathode side of the membrane having no sulfonic acid polymer layer was found to have been dropped to a level of 1.0 meq/g dry resin.

We claim:

1. A method for producing an alkali metal hydroxide by electrolysis in an electrolytic cell comprising an anode compartment and a cathode compartment, which comprises supplying an aqueous alkali metal chloride solution to the anode compartment and water or a dilute alkali metal hydroxide aqueous solution to the cathode compartment, wherein a fluorine-containing cation exchange membrane compound of a laminate of films and comprising a first outer layer of a perfluorocarbon polymer having —$SO_3M$ groups, wherein M is an alkali metal, with a thickness of at least 5 μm, and a second layer of a perfluorocarbon polymer having —$CO_2M$ groups, wherein M is an alkali metal, and a water content of from 2 to 7% by weight in a 45 wt. % NaOH aqueous solution with a thickness of at least 5 μm, the water content of the first layer being higher than that of the second layer, is disposed with the first layer facing the cathode compartment and wherein the concentration of said alkali metal hydroxide produced is from 42 to 55% by weight.

2. The method according to claim 1, wherein the first layer has a thickness of from 10 to 100 μm and an ion exchange capacity of from 0.6 to 1.6 meq/g dry resin, and the second layer has a thickness of from 5 to 300 μm and an ion exchange capacity of from 0.6 to 1.8 meq/g dry resin.

3. The method according to claim 1, wherein the fluorine-containing cation exchange membrane has, on the anode side of the second layer, a third layer of a perfluorocarbon polymer having —$SO_3M$ or —$CO_2M$ groups, wherein M is an alkali metal, and having a specific resistance lower than the second layer and a thickness greater than the second layer.

4. The method according to claim 1, wherein the fluorine-containing cation exchange membrane has, on the anode side of the second layer, a third layer of a porous fluorine-containing polymer having a thickness of from 10 to 450 μm and a porosity of from 30 to 95% with its surface and interior being hydrophilic.

5. The method according to claim 1, wherein a fourth layer of a perfluorocarbon polymer having both —$SO_3M$ and —$CO_2M$ groups exists between the layer of the perfluorocarbon polymer having —$SO_3M$ groups and the layer of the perfluorocarbon polymer having —$CO_2M$ groups.

6. The method according to claim 1, wherein the fluorine-containing cation exchange membrane has its surface treated for releasing chlorine bubbles.

7. An electrolytic cell comprising an anode and a cathode, wherein a fluorine-containing cation exchange membrane comprising a first outer layer of a perfluorocarbon polymer having —$SO_3M$ groups, wherein M is an alkali metal, with a thickness of at least 5 μm, and a second layer of a perfluorocarbon polymer having —$CO_2M$ groups, wherein M is an alkali metal and a water content of from 2 to 7% by weight in a 45 wt % NaOH aqueous solution with a thickness of at least 5 μm, the water content of the first layer being higher than that of the second layer, is disposed between the anode and the cathode with the first layer facing the cathode.

8. The electrolytic cell according to claim 7, wherein the first layer has a thickness of from 10 to 100 μm and an ion exchange capacity of from 0.6 to 1.6 meq/g dry resin, and the second layer has a thickness of from 5 to 300 μm and an ion exchange capacity of from 0.6 to 1.8 meq/g dry resin.

9. The electrolytic cell according to claim 8, wherein the fluorine-containing cation exchange membrane has, on the anode side of the second layer, a third layer of a perfluorocarbon polymer having —$SO_3M$ or —$CO_2M$ groups, wherein M is an alkali metal, and having a specific resistance lower than the second layer and a thickness greater than the second layer.

10. The electrolytic cell according to claim 8, wherein the fluorine-containing cation exchange membrane has, on the anode side of the second layer, a third layer of a porous fluorine-containing polymer having a thickness of from 10 to 450 μm and a porosity of from 30 to 95% with its surface and interior being hydrophilic.

11. The electrolytic cell according to claim 7, wherein a fourth layer of a perfluorocarbon polymer having both —$SO_3M$ and —$CO_2M$ groups exists between the layer of the perfluorocarbon polymer having —$SO_3M$ groups and the layer of the perfluorocarbon polymer having —$CO_2M$ groups.

12. The electrolytic cell according to claim 7, wherein the first layer of the cation exchange membrane is a film formed by coating a liquid composition containing a perfluorocarbon polymer having —$SO_3M'$ groups, wherein M' is a hydrogen atom, an alkali metal or —$NR_1R_2R_3R_4$ wherein each of $R_1$ to $R_4$ is hydrogen or a lower alkyl group on a film constituting the second layer, followed by drying.

13. The electrolytic cell according to claim 7, wherein the fluorine-containing cation exchange membrane has its surface treated for releasing chlorine bubbles.

14. The electrolytic cell according to claim 13, wherein the treatment for releasing chlorine bubbles is roughning of the surface of the cation exchange membrane facing the anode.

15. The electrolytic cell according to claim 13, wherein the treatment for releasing chlorine bubbles is deposition of hydrophilic particles on the membrane surface formed by supplying an electrolytic solution containing iron or zirconia.

16. The electrolytic cell according to claim 13, wherein the treatment for releasing chlorine bubbles is the formation of a gas and liquid permeable porous layer containing electrocatalytically inactive particles.

17. The electrolytic cell according to claim 7, wherein the fluorine-containing cation exchange membrane is disposed in contact with at least one of the anode and the cathode.

* * * * *